(12) United States Patent
Irwin, IV et al.

(10) Patent No.: US 9,052,226 B2
(45) Date of Patent: Jun. 9, 2015

(54) AUTONOMOUS SUMP PUMP SYSTEM

(76) Inventors: David Leonard Irwin, IV, Kettering, OH (US); Fitz-William Byrd Taylor, III, Kettering, OH (US); William Spencer Irwin, Kettering, OH (US)

(*) Notice: Subject to any disclaimer, the term of this patent is extended or adjusted under 35 U.S.C. 154(b) by 568 days.

(21) Appl. No.: 13/429,304

(22) Filed: Mar. 23, 2012

(65) Prior Publication Data

US 2012/0251333 A1    Oct. 4, 2012

Related U.S. Application Data

(60) Provisional application No. 61/471,145, filed on Apr. 2, 2011.

(51) Int. Cl.
| | |
|---|---|
| *F04B 49/025* | (2006.01) |
| *G01F 23/26* | (2006.01) |
| *E03F 5/22* | (2006.01) |
| *F04B 17/03* | (2006.01) |
| *F04D 15/02* | (2006.01) |
| *F04D 13/06* | (2006.01) |

(52) U.S. Cl.
CPC ............ *G01F 23/265* (2013.01); *G01F 23/261* (2013.01); *G01F 23/266* (2013.01); *E03F 5/22* (2013.01); *F04B 17/03* (2013.01); *F04B 49/025* (2013.01); *F04D 15/0218* (2013.01); *F04D 13/068* (2013.01)

(58) Field of Classification Search
CPC ... F04B 49/025; F04D 15/0218; G01F 23/26; G01F 23/261; G01F 23/2634; G01F 23/265; G01F 23/266; G05D 9/12; H01H 35/18
USPC .......... 417/36, 40, 41, 411; 123/179.7, 179.8, 123/179.9, 179.12; 116/112, 128; 318/139, 318/140, 146, 149
See application file for complete search history.

(56) References Cited

U.S. PATENT DOCUMENTS

| | | | | |
|---|---|---|---|---|
| 3,967,134 | A * | 6/1976 | Gibbs | 307/115 |
| 4,652,802 | A * | 3/1987 | Johnston | 318/482 |
| 4,848,290 | A * | 7/1989 | Miller | 123/179.13 |
| 5,990,640 | A * | 11/1999 | Dwyer et al. | 318/400.29 |
| 7,264,449 | B1 * | 9/2007 | Harned et al. | 417/36 |
| 7,373,817 | B2 * | 5/2008 | Burdi et al. | 73/290 R |
| 8,047,805 | B2 * | 11/2011 | Bourell et al. | 417/36 |
| 8,430,641 | B2 * | 4/2013 | Noel | 417/41 |

OTHER PUBLICATIONS

Unknown. Basement Watchdog Information Brochure AC and Backup. 2009. Glentronics, Inc. Lincolnshire, IL, USA. p. 1-2.
Unknown. Basement Watchdog Computer Controlled A/C-D/C Sump Pump System Instruction Manual. 2007. Glentronics, Inc. Lincolnshire, IL, USA. p. 1-16.
Unknown. Water Alarm Manual. 2007. Glentronics, Inc. Lincolnshire, IL, USA. p. 1-2.

(Continued)

*Primary Examiner* — Devon Kramer
*Assistant Examiner* — Patrick Hamo
(74) *Attorney, Agent, or Firm* — Sam S. Han

(57) ABSTRACT

An autonomous sump (ASP) system is designed to remove water from a sump using a source of power other than commercial electrical power or battery power. The ASP system can be a stand-alone unit or, alternatively, can be used along with a preexisting sump pump system. In some embodiments, the ASP system can provide an alert to a building owner of the ASP system failure.

9 Claims, 6 Drawing Sheets

(56) References Cited

OTHER PUBLICATIONS

Unknown. Basement Watchdog "Big Dog" Dual Float Switch and Controller web page advertisement. 2011. www.basementwatchdog.com/basement_watchdog_bigdog.htm Glentronics, Inc.

Unknown. The Basement Sentry Series 12 Volt Backup Sump Pump Systems Model 507 & Model 510 Information Brochure. 2011. Zoeller Co. Louisville, KY, USA. p. 1-2.

Unknown. Model 510 "The Basement Sentry II" 12 Volt DC Backup Pump Installation Instructions. 2008. Zoeller Co. Louisville, KY, USA. p. 1-8.

Unknown. Deep Cycle Battery Handling, Maintenance and Test Procedure Instruction Manual. 2008. Zoeller Co. Louisville, KY, USA. p. 1-4.

Unknown. Northern Tool-Portable Generator Buyer's Guide. Internet Catalogue. 2011. www.northerntool.com. Northern Tool + Equipment. Burnsville, MN, USA.

* cited by examiner

AUTONOMOUS SUMP PUMP SYSTEM

CROSS-REFERENCE TO RELATED APPLICATIONS

This application claims the benefit of U.S. provisional patent application Ser. No. 61/471,145, filed 2011 Apr. 2, having the title Automatic Sump Pump System, which is incorporated herein by reference in its entirety.

STATEMENT REGARDING FEDERALLY SPONSORED RESEARCH OR DEVELOPMENT

Not Applicable

THE NAMES OF PARTIES TO A JOINT RESEARCH AGREEMENT

Not Applicable

INCORPORATION BY REFERENCE OF MATERIAL SUBMITTED ON A COMPACT DISC

Not Applicable

BACKGROUND

1. Technical Field

The present disclosure relates generally to sump pump systems and, more particularly, to autonomous notification and removal of water from a sump well.

2. Description of the Related Art

Traditional sump pump systems are powered off a building's power supply, which is typically connected to a commercial power utility line provided by a commercial electric provider. When the commercial power utility line fails to deliver electrical power to the building, a sump pump system cannot remove water from a sump well until electrical power is restored. Sump pump systems utilizing a battery as a backup power source have been developed to overcome the shortcomings of the traditional sump pump systems. Some systems provide alerts to a nearby person of sump pump system failures and operation. A separate alarm system can also be installed that provides an alert to a nearby person if water is in a sump well.

SUMMARY

The present disclosure provides a building owner with a sump pump system that will automatically remove water from a sump well independent of a building's dependency on a power grid, be it public utility or private whole-building generator. Current sump pump systems do not provide for a sump pump system operation during extended power outages. Briefly described, in one embodiment, an autonomous sump pump system uses a generator, independent of the building's power grid, to power the sump pump system as a standalone system.

Other systems, devices, methods, features, and advantages will be or become apparent to one with skill in the art upon examination of the following drawings and detailed description. It is intended that all such additional systems, methods, features and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION OF THE EMBODIMENTS

Figure 1:
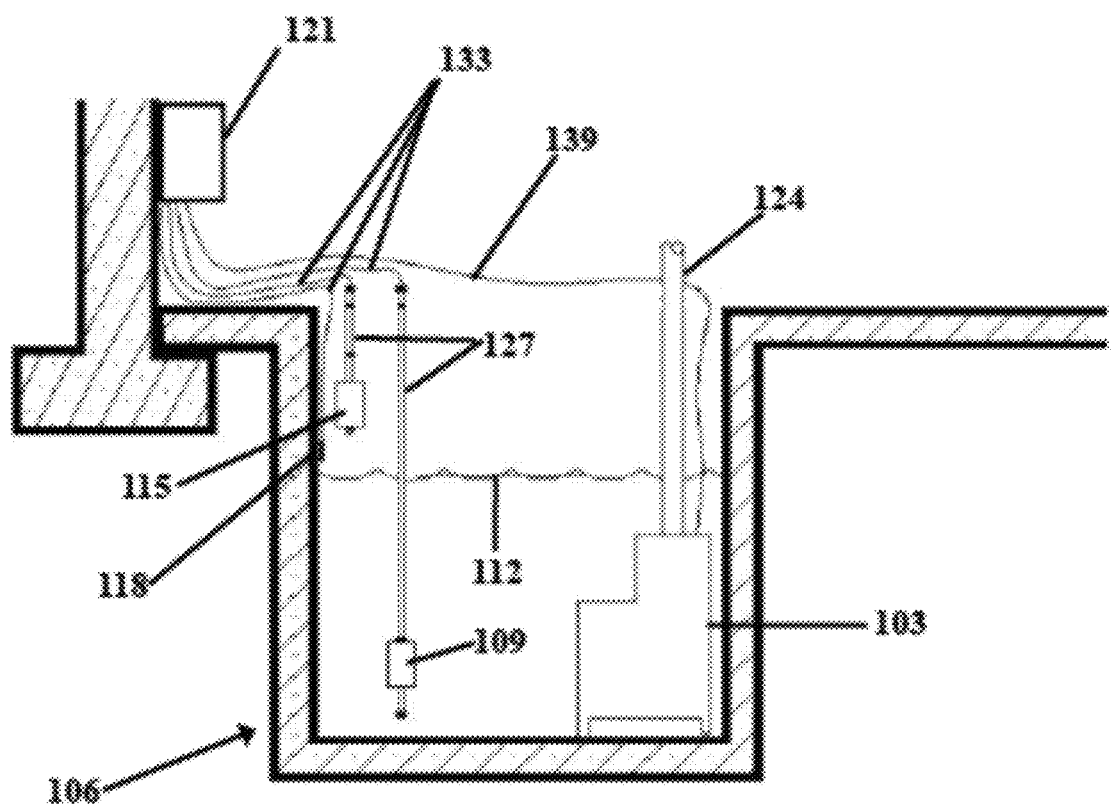
FIG. 1 is a diagram showing the components in a generator powered autonomous sump pump system as a standalone system.

Reference is now made in detail to the description of the embodiments as illustrated in the drawings. While several embodiments are described in connection with these drawings, there is no intent to limit the disclosure to the embodiment or embodiments disclosed herein. On the contrary, the intent is to cover all alternatives, modifications, and equivalents.

Traditional sump pump systems are designed to rely solely on commercial electric power or a whole building generator, which supplies power to an entire building. Thus, traditional sump pump systems cannot remove water from a sump well during a power outage. To solve the problem of traditional sump pump system failure during a power outage, some sump pump systems are designed to have a secondary power source. Typically, the secondary power source is a battery, which suffers from a limited battery life, providing only a few hours of power to the sump pump system. Thus, the use of a battery as a second power source does not eliminate the issue of sump pump system failure during an extended power outage, but merely delays it. This is particularly problematic for building owners who are not in the building for extended periods of time, such as the common occurrence of homeowners going on vacation. The use of batteries also created new issues, as batteries require frequent maintenance, charging, and replacement, which are inconvenient and often neglected by the building owner.

Small portable gas-powered electric generators are available to a building owner to provide power independent of the building's power grid. These types of generators are not well suited to run currently available sump pump systems. Most traditional sump pump systems are hardwired into the building's power grid. Thus, there is no way for a building owner with a hardwired traditional sump pump system to connect to the small portable gasoline-powered electric generator. The small portable gasoline-powered electric generator would not be effective as a back up to a sump pump system utilizing a battery as a primary or a secondary power source. Some commercially available sump pump systems rely on a control unit that must receive 115 V from an AC outlet, battery, or other power source. Any voltage less than 115 V will result in control unit failure and subsequent sump pump failure and property damage. Thus, in order to operate a battery-powered sump pump system, the small portable gasoline-powered electric generator must be run indefinitely. Continuous operation of a small portable gasoline-powered electric generator to provide power to a sump pump system is impractical as it would waste a significant amount of gasoline and create substantial noise. Further, if the generator were not running indefinitely, the controller of a battery-powered sump pump system would never receive 115 V necessary to function, fail to turn on, and thus render this combination inoperable during extended power outages or battery failure.

Typical sump pump systems rely on a single float switch to control the operation of a sump pump. When water fills the sump well it activates the single float switch and signals the sump pump to turn on. Systems that utilize the single float switch suffer from sump pump system failure when the float switch malfunctions. Debris in the sump well may cause the float switch to get stuck in the "off" position and not signal the sump pump to turn on. Water is not removed from the sump well resulting in flooding and property damage. Current systems that use more than one float switch are set up so that two float switches are redundant of one another. A first float switch and a second float switch are configured so that if the first float switch gets stuck and fails to signal the sump pump to turn on, then the second float switch automatically activates and signals the sump pump to turn on. In these systems, although there are two float switches, only one is active at any given time.

Additionally, the single float switch may get stuck in the "on" position and cause the sump pump to run continuously. This can result in the sump pump failing prematurely and not removing water from the sump well. Similarly, the constant rising and falling of water within the sump well causes the single float switch to turn the sump pump on and off in rapid succession as the single float switch rises and falls with the changing water level. This common and constant on/off pattern is known as "short-cycling" and causes unnecessary wear and tear on a sump pump motor. Therefore, "short-cycling" leads to premature failure and failure of the sump pump motor. Control systems available today that utilize more than one float switch do not allow for independent adjustment of the float positions within the sump well as the floats are contained within a fixed cage to reduce the chance of interference from debris in the sump well. Therefore, these systems cannot overcome the problems associated with "short-cycling."

Compounding the mechanical problems of traditional and battery backup sump pump systems, system failure often occurs when a building owner is not present to realize the failure. For example, the sump pump system may fail when the building owner is not home or is on vacation for an extended time. Current sump pump systems, either with or without a secondary power source, do not provide a notification to the building owner of the sump pump system failure, in the building owner's absence. The lack of notification limits the building owner's opportunity to remedy the sump pump system failure in a timely manner, resulting in increased property damage. Thus, an unaddressed and long-felt need exists to provide the building owner with a reliable autonomous sump pump system that can also provide an off-site building owner autonomous notification of the sump pump system failure to reduce costly property damage.

To overcome the long-standing deficiencies of the current sump pump systems, an autonomous sump pump (ASP) system utilizes a generator, which is independent of a building's primary power grid. In one embodiment, the ASP comprises a float, a sump pump, a control unit, and a generator. An electrical coupling between the float and the control unit allows the float to send signals to the control unit. Similarly, another electrical coupling between the control unit and the generator allows the control unit to electrically activate and deactivate the generator. Likewise, the generator and the sump pump are electrically coupled so that the generator provides power to the sump pump.

In operation, the float rises and falls with water levels in a sump pit. When the water level in the sump pit rises to a predefined level, the float is triggered, thereby sending an electrical signal to the control unit via the electric coupling between the float and the control unit. Upon receiving the electrical signal, the control unit activates the generator via the electrical coupling between the control unit and the generator. The activated generator provides electrical power to the sump pump, thereby resulting in evacuation of water from the sump pit. When the water level recedes, the float correspondingly drops below the predefined level (or another predefined level), which sends another electrical signal to the control unit to deactivate the generator. Unlike conventional controllers, which control the operation of the sump pump, the control unit in the following embodiments controls the generator.

For some embodiments, operation of the generator is controlled by activation and deactivation of two independently adjustable float switches located within the sump well. When the sump well starts to fill up with water, a lower-level float switch is activated and primes the generator to run. As the water rises in the sump well, an upper-level float switch is activated and starts the generator. The generator powers a sump pump and water is removed from the sump well by the sump pump. As water is removed from the sump well, the upper-level float switch is deactivated. As more water continues to be removed from the sump well, the lower-level float switch is also deactivated. When both the upper-level float switch and lower-level float switches are deactivated the generator stops running, thereby resulting in the sump pump being turned off and no more water being removed from the sump well. As the water level rises again, the process is repeated. The float switches within the ASP system are independently adjustable so they can be installed in the sump well in positions that minimize "short cycling". Again, the control unit in this controls the generator, which in turn provides power to the sump pump.

The ASP system also utilizes a moisture sensor alarm module, which is configured to automatically notify the building owner of a sump pump system failure. When water in the sump well reaches the moisture sensor located within the sump well, a moisture sensor alarm is activated. The moisture sensor alarm sends a notification message, such as an email, to the building owner indicating that moisture is detected.

The ASP system, as shown and described herein, is a versatile and customizable system that enables the building owner to use the ASP system as a whole or use individual components. For example, the moisture sensor alarm module can be used to indicate the sump pump system failure without the rest of the ASP system by incorporating it with a preexisting sump pump system such as a traditional or battery-back up sump pump system. In another example, the upper- and lower-level float switches of the ASP system can be added to a preexisting sump pump by bypassing a float switch in the preexisting sump pump system. The ASP system is particularly advantageous for remote or unoccupied buildings where reliability is essential and on-site monitoring is not possible.

The ASP system preferably uses a natural gas generator to provide power to the sump pump independent of any building power grid or battery power, thereby ameliorating some of the aforementioned inadequacies. The generator may have a capacity of up to approximately 3000 Watts, but is preferably between approximately 1000 Watts and approximately 1500 Watts. The generator may be configured such that a flow rate of water removed from the sump well by the sump pump is up to approximately 35 gallons per minute.

FIG. 1 shows one embodiment of the ASP system as a standalone, primary system, independent of any battery or building power grid. A sump pump (103) is connected to an outlet pipe (124), which expels water from a sump well (106) to the outside of the building. An upper-level float (115) and a lower-level float (109) are connected to a generator control box (121) located on the generator by low voltage electrical wiring (133). The low voltage electrical wiring (133) is protected within conduits (127). A moisture sensor (118) is connected to the control box (121) by low voltage electrical wiring (133). The sump pump (103) is connected to the generator control box (121) by power electrical wiring (139).

As the water level (112) rises, the lower-level float (109) floats and transmits a run signal to the control box (121). When the water reaches the upper-level float (115), the upper-level float (115) floats and transmits a start signal to the generator control box (121) thereby starting the sump pump (103). Water is removed to the exterior of the building through the outlet pipe (124). As the water recedes below the lower-level float (109), the lower-level float (109) no longer floats and ceases to provide the run signal to the generator control box (121) and the sump pump (103) stops removing the water from the sump well.

Figure 2:
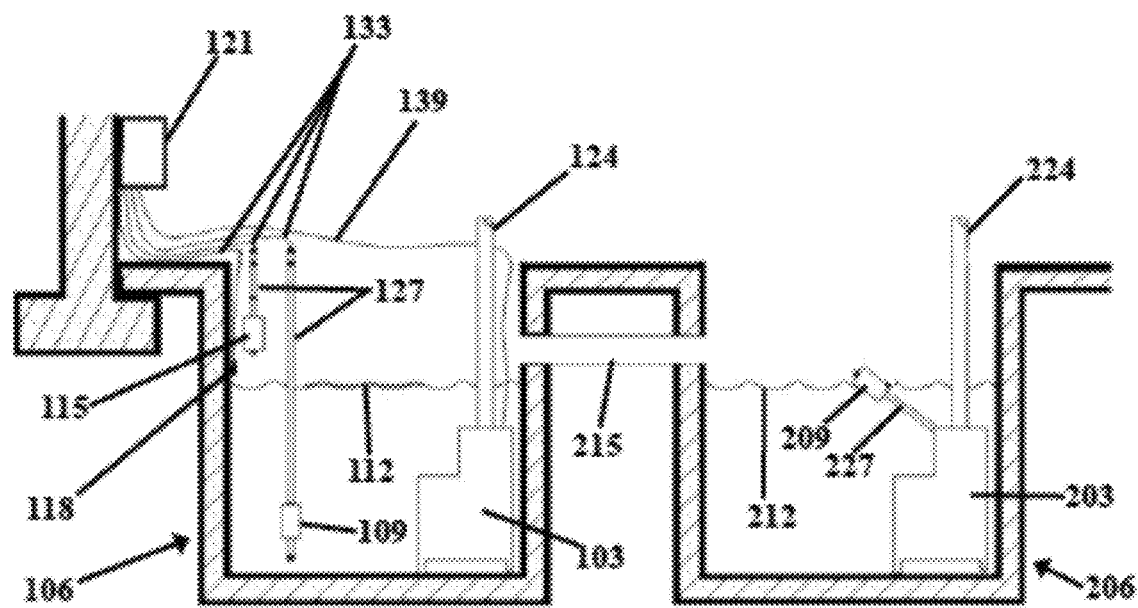
FIG. 2 is a diagram showing the components of a generator powered autonomous sump pump system coupled to and used with a preexisting sump pump system.

In other embodiments, the ASP system can also be added to a preexisting sump pump system to handle any overflow water that the preexisting sump pump system cannot handle. FIG. 2 shows the ASP system as a back up-system to a preexisting sump pump system. The preexisting sump pump system has a preexisting sump well (206), a preexisting sump pump (203), a preexisting float (209), a mount (227), and a preexisting outlet pipe (224). The preexisting float (209) monitors a water level (212) in the preexisting sump well (206). An overflow pipe (215) is added to the preexisting sump well (206) to allow any surplus water to flow into the sump well (106) in case of either preexisting sump pump (203) failure or an inability of preexisting sump pump (203) to pump out the water at a rate that is greater than the rate at which water fills the preexisting sump well (206). As water flows into the sump well (106) and the water level (112) rises, the ASP system will activate to evacuate the water from the sump well (106). Insofar as the operation of the ASP system has been described with reference to FIG. 1, that description is omitted here.

In another embodiment the ASP floats and associated parts (121, 127, 115, 109, 133; FIGS. 1 and 2) and generator could also be added to a preexisting sump system by being added to a preexisting sump well (206; FIG. 2) directly without the need for a new sump well (106; FIGS. 1 and 2), new sump pump (103; FIGS. 1 and 2) or an overflow pipe (215; FIG. 2). The ASP float switches could be used to bypass the preexisting float (209 and 227; FIG. 2). The preexisting sump pump (203; FIG. 2) could then be powered by the generator or its original primary power source, which would be controlled by the ASP floats and associated parts (121, 127, 115, 109, 133; FIGS. 1 and 2). The ASP generator, floats and associated parts would operate as previously described.

Figure 3:
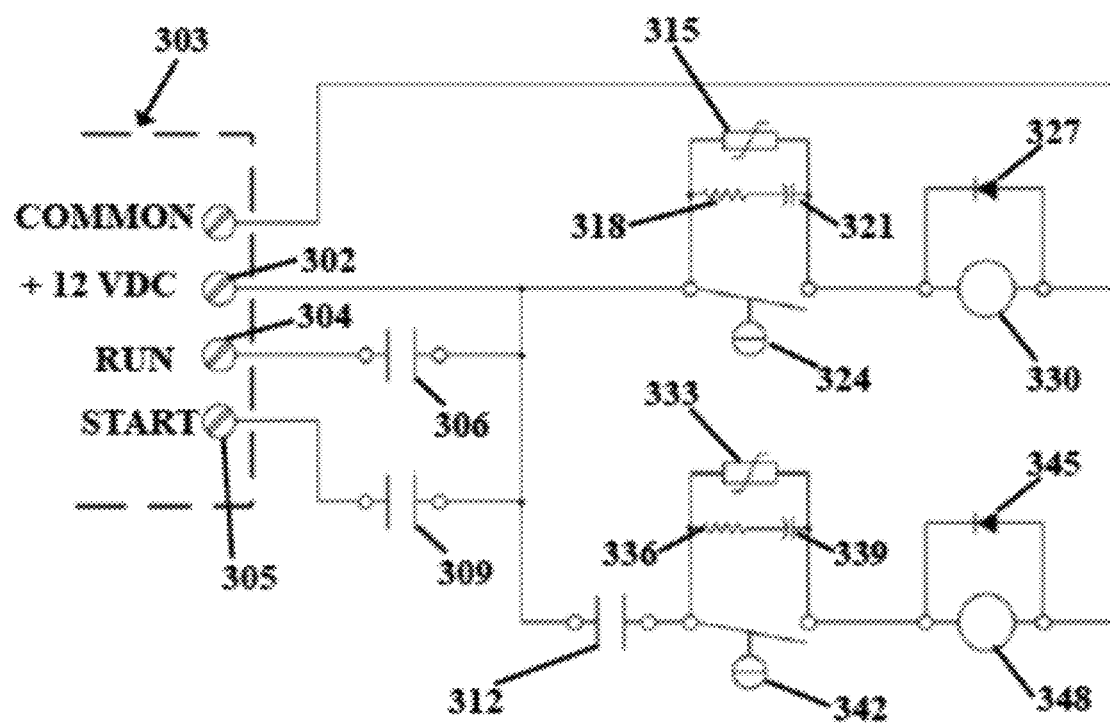
FIG. 3 is a circuit schematic showing a control circuit for a generator powered autonomous sump pump system.

FIG. 3 is a circuit schematic showing an ASP control circuit in the generator control box (121) of the ASP system of FIGS. 1 and 2. This circuit controls operation of the generator and thus the sump pump. The control circuit uses an upper-level float switch (342) and a lower-level float switch (324) to control the starting and stopping of a generator (303), which provides power to the sump pump (103; FIGS. 1 and 2). The lower-level float (109; FIG. 1) is mounted in the sump well (106; FIGS. 1 and 2), such that the rising water level (112; FIGS. 1 and 2) in the bottom of the sump well (106; FIGS. 1 and 2) causes the lower-level float switch (324) to close and provide electric current to a coil of a RUN control relay (330). In series, a first resistor (318) and a first capacitor (321) are connected in parallel with a first Metal Oxide Varistor (315) and the lower-level float switch (324). This first resistor-capacitor network connected in parallel with the first Metal Oxide Varistor (315) reduces transient voltage spikes that could damage the internal reed switch of the lower-level float (109; FIGS. 1 and 2). A RUN diode (327) is connected in parallel with the RUN control relay (330) to allow the energy stored by the inductance of the coil to dissipate when the coil is de-energized. The electrical current flowing through the coil of the RUN control relay (330) causes the relay to energize and close two "Normally Open" (N.O.) contact sets of the RUN control relay (330). A first RUN control relay contact (306) and a second RUN control relay contact (312) are used to control the operation of the sump pump (103; FIG. 1). When the first RUN control relay contact (306) is closed, the generator (303) "Run" signal (304) maintains the generator fuel valve in the open position and enables the generator engine to run the electric motor. When the second RUN relay contact (312) is closed, +12 VDC power (302) from the generator (303) control circuit energizes the upper-level float switch (342).

The upper-level float (115; FIGS. 1 and 2) is mounted in the sump well (106; FIGS. 1 and 2), such that the rising water level (112; FIGS. 1 and 2) in the sump well (106; FIGS. 1 and 2) causes the upper-level float switch (342) to close and provide electric current to a coil of a START control relay (348). In series, a second resistor (336) and a second capacitor (339) are connected in parallel with a second Metal Oxide Varistor (333) and the upper-level float switch (342). This second resistor-capacitor network connected in parallel with the second Metal Oxide Varistor (333) reduces transient voltage spikes that could damage the internal reed switch of the upper-level float (115; FIGS. 1 and 2). A START diode (345) is connected in parallel with the START control relay (348) to allow the energy stored by the inductance of the coil to dissipate when the START control relay coil is de-energized. The electrical current flowing through the coil of the START control relay (348) causes the relay to energize and close one N.O. contact of the START control relay (348). When a START control relay contact (309) is closed, the +12 VDC (302) is connected to the generator (303) "Start" signal (305) that energizes the generator starter motor and causes the generator starter motor to start.

When the water level (112; FIGS. 1 and 2) in the sump well (106; FIGS. 1 and 2) falls below the lower-level float (109; FIGS. 1 and 2), the RUN control relay (330) opens. When the RUN control relay (330) opens, the "Run" signal (304) ceases to get +12 VDC (302) and closes the fuel valve, stopping the generator (303).

Figure 4:
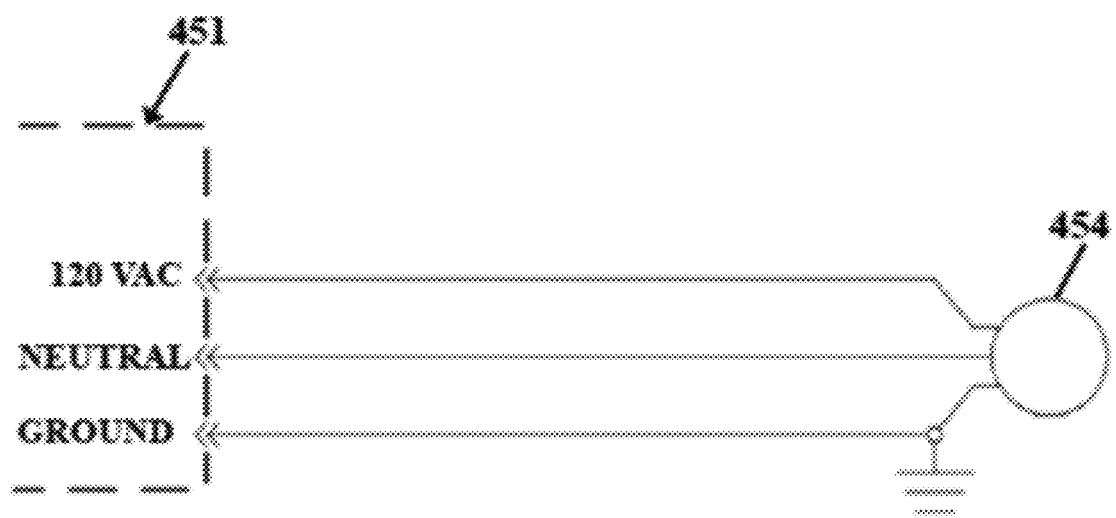
FIG. 4 is a circuit schematic showing a power supply for a sump pump in a generator powered autonomous sump pump system.

FIG. 4 shows a circuit used to run a sump pump motor (454), which can be found in the sump pump (103; FIGS. 1 and 2) of the ASP system. The sump pump motor (454) is connected to an outlet (451) on the generator (303; FIG. 3). When the above sequence of events takes place and the generator (303; FIG. 3) is started, the generator (303; FIG. 3) provides 120 Volts, alternating current, to the outlet (451) and powers the sump pump motor (454) until the aforementioned ASP control circuit turns the generator off.

Figure 5:
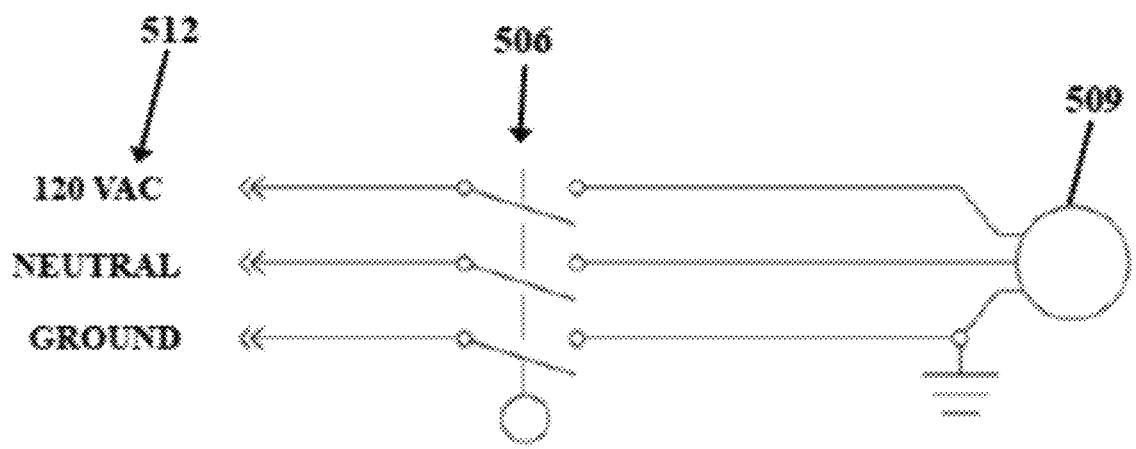
FIG. 5 is a circuit schematic showing a power circuit for a sump pump motor.

FIG. 5 shows a typical power and control circuit of a preexisting sump pump system. The preexisting sump pump system with a preexisting sump pump motor (509) is connected to a building's power grid through an electrical outlet (512). A preexisting float switch (506) is used to control the power to the preexisting sump pump motor (509).

For other embodiments, the ASP system has the added feature of an integrated moisture alarm module, which provides a notification message to the building owner when the incorporated moisture sensor detects water, thereby adding another level of protection for the building owner. The moisture sensor is placed in the sump well at a level determined by the needs of the building owner. For example, if the building owner wants to detect a sump well that is filled to or exceeding capacity, or in other words, sump pump failure, the moisture sensor element (118; FIGS. 1 and 2) may be placed above the upper-level float (115; FIGS. 1 and 2). Exact location of the moisture sensor element placement is customizable based on the needs of the building owner and can be installed to detect any level of water in the sump well.

Figure 6:
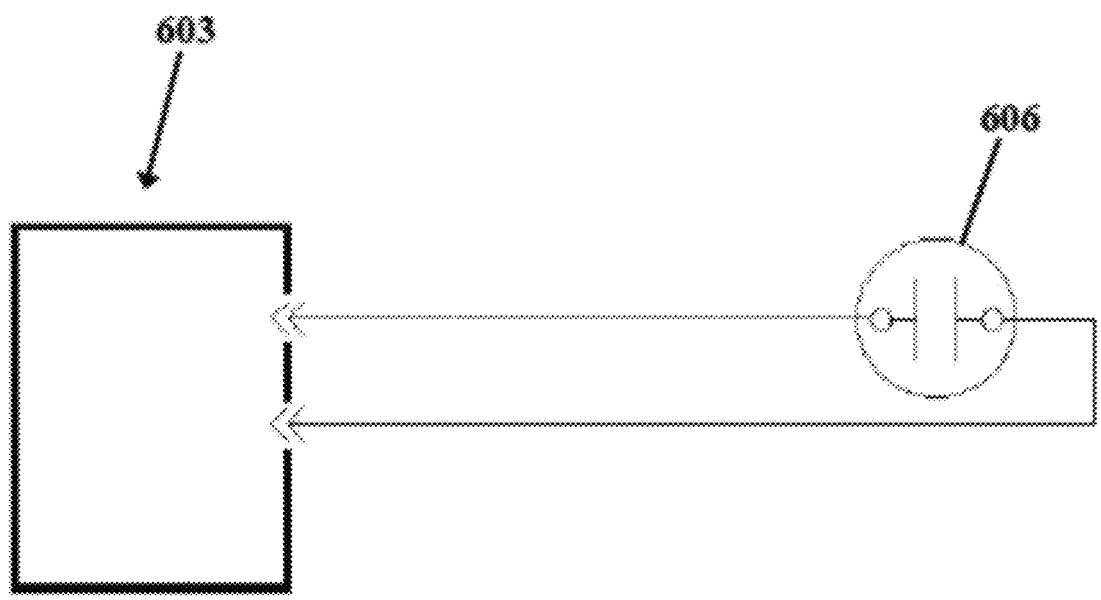
FIG. 6 is a circuit schematic showing a moisture alarm circuit.

FIG. 6 shows a moisture alarm module circuit. The moisture alarm module is made up of a moisture sensor (118; FIGS. 1 and 2) which is located within the sump well (106; FIGS. 1 and 2) and a moisture sensor alarm located within the control box (121; FIGS. 1 and 2). The moisture sensor (118; FIGS. 1 and 2) comprises a moisture sensor element (606), which is a N.O. contact. When the moisture sensor element (606) comes into contact with water, the moisture sensor element (606) conducts electricity to signal the moisture sensor alarm (603) to indicate moisture. The moisture sensor alarm is a control box containing circuitry, which comprises an Ethernet TCP/IP port for connection to an Ethernet network. The moisture sensor alarm can indicate moisture by notifying a nearby building owner using an audible signal or light signal. Additionally the moisture sensor alarm, as configured in this embodiment can indicate moisture by notifying an absentee building owner by sending an email message, activating an outgoing telephone call to a preset telephone number and playing a digitized messaged, or sending a text message to a preset telephone number.

There are technical hurdles that need to be overcome in configuring and installing the ASP system, as disclosed herein. For example, those having skill in the art, such as homeowners or residential contractors, will appreciate the fact that no current sump pump system exists that is independent of a building's electrical power grid. Insofar as the above-described ASP is a customized system that is not commercially available, the ordinary homeowner would not have the expertise to design and install such a customized system. For example the ordinary homeowner would not be able to determine the optimal positions to install the floats in the APS to minimize "short cycling" of the sump pump. Furthermore, residential contractors, who typically install commercially-available systems, would not be motivated to create a custom-designed system, such as the above-described ASP system, since the design and installation of such a customized system would require investment of design and engineering resources that are normally unavailable to typical residential contractors.

Although exemplary embodiments have been shown and described, it will be clear to those of ordinary skill in the art that a number of changes, modifications, or alterations to the disclosure as described may be made. For example, as used throughout this application, the generator can be a gasoline, propane, natural gas, or diesel powered generator or a multi-fuel generator that can operate on natural gas, propane, or gasoline. A propane generator could be supplied by an onsite tank, a LPG connector to allow the building owner to use a grill propane tank to power the generator, or the building's propane supply line. A natural gas generator could be supplied by an onsite tank or by the building's natural gas supply line. The float switches can be diaphragm switches, tethered float switches or vertical action float switches.

The alarm module can alert the building owner by sound, light, vibration, telephone, or any other method of communication. The moisture alarm module can be installed to detect any level of water within the sump well. All sump pump systems are unique depending on size of the well, amount of typical water load and availability of the building owner to monitor the system. Therefore exact placement, need and use of the ASP system must be determined on a case-by-case basis. All such changes, modifications, and alterations should therefore be seen within the scope of the disclosure.

What is claimed is:

1. A system, comprising:
(a) a sump pump;
(b) a generator to provide power to the sump pump; and
(c) a control unit to control operation of the generator, the control unit comprising:
(c1) a RUN control relay:
(c2) a lower-level float;
(c3) a lower-level float switch coupled to the lower-level float, the lower-level float switch being responsive to the lower-level float, the lower-level float switch providing electrical current to the RUN control relay when the lower-level float switch is closed;
(c4) a first resistor-capacitor network connected in parallel with the lower-level float switch;
(c5) a START control relay;
(c6) a START diode connected in parallel to the START control relay;
(c7) an upper-level float;
(c8) an upper-level float switch coupled to the upper level float, the upper-level float switch being responsive to the upper-level float, the upper-level float switch providing electrical current to the START control relay when the upper-level float switch is closed;
(c9) a second resistor-capacitor network connected in parallel with the upper-level float switch.

2. The system of claim 1, wherein
the upper-level float switch operates independently of the lower-level float switch.

3. The system of claim 1, the generator having a capacity of up to approximately 3000 Watts.

4. The system of claim 1, the generator having a capacity of between approximately 1000 Watts and approximately 1500 Watts.

5. The system of claim 1, the sump pump having a flow rate of up to approximately 35 gallons per minute.

6. The system of claim 1, the control unit comprising:
a first circuit to prime the generator, the first circuit comprising the upper-level float switch; and
a second circuit to activate the generator, the second circuit comprising the upper-level float switch and the lower-level float switch, the upper-level float switch operating independently of the lower-level float switch.

7. The system of claim 1, the generator being a natural gas powered generator.

8. A control unit, comprising:
a RUN control relay;
a lower-level float switch providing electrical current to the RUN control relay when the lower-level float switch is closed;
a first resistor-capacitor network connected in parallel with the lower-level float switch, the first resistor-capacitor network comprising:
a first metal oxide varistor;

a first resistor; and
a first capacitor connected in series with the first resistor, the first metal oxide varistor being connected in parallel to the serially-connected first resistor and the first capacitor;
a START control relay;
an upper-level float switch operating independently of the lower-level float switch, the upper-level float switch providing electrical current to the START control relay when the upper-level float switch is closed;
a second resistor-capacitor network connected in parallel with the upper-level float switch, the second resistor-capacitor network comprising:
a second metal oxide varistor;
a second resistor; and
a second capacitor connected in series with the second resistor, the second metal oxide varistor being connected in parallel to the serially-connected second resistor and the second capacitor.

9. A system, comprising:
a natural gas powered generator having a capacity of up to approximately 3000 Watts;
a RUN control relay for continuing operation of the natural gas powered generator;
a lower-level float switch providing electrical current to the RUN control relay when the lower-level float switch is closed;
a first resistor-capacitor network connected in parallel with the lower-level float switch;
a START control relay for starting operation of the natural gas powered generator;
an upper-level float switch operating independently of the lower-level float switch, the upper-level float switch providing electrical current to the START control relay when the upper-level float switch is closed;
a second resistor-capacitor network connected in parallel with the upper-level float switch.

* * * * *